United States Patent [19]
March et al.

[11] Patent Number: 5,960,704
[45] Date of Patent: Oct. 5, 1999

[54] CONTACT TOASTER

[75] Inventors: Scott P. March, Lombard; Clark R. Agcaoili, St. Charles, both of Ill.

[73] Assignee: A.J. Antunes & Co., Addison, Ill.

[21] Appl. No.: 09/015,117

[22] Filed: Jan. 29, 1998

[51] Int. Cl.⁶ .................................................. A47J 37/08
[52] U.S. Cl. ................. 99/349; 99/372; 99/373; 99/385; 99/386; 99/389; 99/443 R
[58] Field of Search ............................ 99/385, 386, 388, 99/389, 391, 392, 349, 372, 373, 401, 376, 443 R

[56] References Cited

U.S. PATENT DOCUMENTS

| | | |
|---|---|---|
| 3,646,880 | 3/1972 | Norris ........................................ 99/349 |
| 4,121,509 | 10/1978 | Baker et al. .............................. 99/386 |

*Primary Examiner*—David Lacey
*Assistant Examiner*—Drew Becker
*Attorney, Agent, or Firm*—Rudnick & Wolfe

[57] ABSTRACT

An improved contact toaster for heating sandwich buns and other food items features a housing containing a toasting chamber with an inlet and an outlet. The toasting chamber contains a pair of conveyor belts with a heated platen positioned between them. Each conveyor belt features a platen-facing portion so that two pathways are defined. Each conveyor belt also features a heat-distributing surface. Two auxiliary heaters are positioned so that one of each heats one of each of the platen-facing portions of the conveyor belts. One of each of a pair of tensioners engages one of each of the platen-facing portions of the conveyor belts so that each pathway tapers inward to a minimum thickness and then expands outward again. As a result, food items moving through the pathways via the conveyor belts are toasted on both surfaces and also absorb heat from both the platen and the conveyor belt surfaces in a sponge-like manner as they are compressed and released.

26 Claims, 4 Drawing Sheets

CONTACT TOASTER

BACKGROUND OF THE INVENTION

1. Field of the Invention

The invention relates generally to devices for toasting food items such as sandwich buns and the like and, more particularly, to an improved contact toaster that efficiently toasts a bun's interior surface, heats the bun's exterior surface and warms the bun internally.

2. Description of Related Art

Toasted sandwich buns and bread slices, when used in making hamburgers and other sandwiches, are highly valued by consumers for many reasons. For example, toasting a bun results in a carmelizing effect on its interior surfaces that provides a pleasing appearance and taste. This carmelizing effect also effectively seals the interior surfaces thereby preventing the absorption of juices from the meat and other ingredients, such as ketchup and mustard, into the bun. Accordingly, with the advent of fast-food restaurants that serve sandwiches, devices that efficiently toast a large number of buns in a short period of time have become desirable.

In response to this demand, devices such as those disclosed in U.S. Pat. Nos. 4,261,257 to Henderson et al. and 4,530,276 to Miller have been developed. These toasting devices both feature a housing containing a platen having two opposed heating surfaces. Conveyor belts are positioned on opposite sides of the platen and are spaced therefrom. The two halves of a bun are inserted into inlets at the top of the housing so that they are received into the spaces between the platen and a respective conveyor belt. The conveyor belts in turn slide the internal surfaces of the bun halves across the platen so that they are toasted. When the bun halves reach the bottom of the conveyor belts, they are disposed upon a tray at the outlet of the housing.

While devices such as those disclosed in Henderson et al. and Miller have proven to be effective in the restaurant industry, they primarily provide toasting only of the interior surfaces of the bun halves. This is a disadvantage in that, for many reasons, it is desirable to toast the exterior surfaces (i.e.: the top and bottom) of a bun as well as heat the bun body internally. Heating the bun exterior surfaces and body provides a softer and warmer overall quality to buns that consumers find pleasing. Heating the entire bun, as opposed to just the interior surfaces, also maintains the warmth of the sandwich contents for a longer period of time.

In addition, if the food item toasted is something other than typical bun halves, toasting only one side may not be sufficient. For example, many restaurants serve double or triple-decker sandwiches that feature a bun middle section with two interior surfaces or faces. It would be clearly preferable to toast both of these faces. The same can be said for situations where, instead of typical bun halves, the food items being toasted are bread slices. Accordingly, a device that heats both sides and the body of food items would have greater effectiveness and versatility.

As a result, devices such as the one disclosed in U.S. Pat. No. 5,673,610 to Stuck have been developed. The device of Stuck includes the same features as the two patents discussed above but adds a pair of resistance-type auxiliary heaters that are positioned in proximity to the conveyor belts. While this addition allows both sides of a bun half or similar food item to be heated, the device still suffers from a number of limitations.

The auxiliary heaters of Stuck toast the exterior surfaces of a pair of bun halves by radiating heat through the wire conveyor belts. This occurs as the bun halves are slid along the centrally positioned platen. Accordingly, the interior surface of each bun half is heated by contact with the platen while the exterior surface of each bun half is heated by radiated heat from the auxiliary heaters. Any heating of the bodies of the bun halves, however, occurs only by conduction of the heat from the surfaces. As a result, the heating of the bodies of the bun halves is much less than optimal.

In addition, the arrangement of Stuck limits the temperature level of the auxiliary heaters. More specifically, if the temperature of the auxiliary heaters is set too high, the wire conveyor belts will heat up and burn the exterior surfaces of the bun halves. This results in burnt belt marks on the exterior surfaces of the buns which consumers find undesirable. In addition, in extreme cases, the burnt belt marks may extend deep within the bun halves, rendering them unusable.

Limiting the temperature of the auxiliary heaters limits the speed at which the device may be operated. This is a critical consideration in the fast-food industry. If the temperature of the auxiliary heaters could be increased without burning belt marks into the buns, the device could toast many more buns in a shorter period of time.

SUMMARY OF THE INVENTION

Accordingly, it is an object of the present invention to provide an improved contact toaster that toasts the interior and exterior surfaces of a food item.

It is another object of the present invention to provide an improved contact toaster that effectively heats a food item internally.

It is still another object of the present invention to provide an improved contact toaster that may efficiently toast a large number of food items in a short amount of time.

The present invention is directed to an improved contact toaster for conveyorized toasting of sandwich buns and similar food items. The device features a housing having an inlet for receiving the food items and an outlet for discharging the food items after they are toasted. A toasting chamber is located between the inlet and the outlet and contains a pair of conveyor belts with a heated platen positioned between them. Each conveyor belt has a portion facing the platen in a spaced apart relationship so as to define a pair of pathways. A drive system including an electric motor activates the conveyor belts so that they may transport bun halves or other food items through the pathways. The pathways are sized so that a surface of each food item is slid across the platen as it moves through the pathway. This provides a toasting or carmelizing effect for that surface.

A pair of tensioners are positioned so that one of each engages one of each of the conveyor belt platen-facing portions. The tensioners are shaped so that the two pathways taper inward to a minimum thickness and then expand outward again. As a result, food items are compressed and released as they travel through the pathways. Accordingly, food items are heated internally as they absorb heat from the platen in a sponge-like manner.

The toasting chamber also contains a pair of auxiliary heaters. One of each of the heaters is positioned proximate to one of each of the platen-facing portions of the conveyor belts. Each of the conveyor belts features a heat-distributing surface that is heated by the auxiliary heater positioned in proximity thereto. As a result, food items are also heated internally with heat from the conveyor belt heat-distributing surfaces as they are compressed and released in the pathways. In addition, the surfaces of the food items that are in contact with the heat-distributing surfaces are also heated.

A pair of abutment members are mounted upon a pair of axial rods rotatably mounted in the housing of the device. One of each of the abutment members engages one of each of the pair of tensioners. As a result, the thickness of the pathways may be adjusted to accommodate food items of various sizes.

A chute is positioned between the conveyor belts and the outlet. One of the conveyor belts is positioned in closer proximity to the chute than the other conveyor belt and is operated at a higher speed. As a result, for example when bun halves are prepared, a first toasted bun half is dropped on the chute by the proximate conveyor belt and then the other toasted bun half is dropped on top of it as the first bun half slides down the chute to the outlet. This allows the buns, or other food items to be received at the outlet in a stacked configuration.

The device also features a damper positioned at the inlet and outlet to reduce heat loss and improve efficiency.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 1:
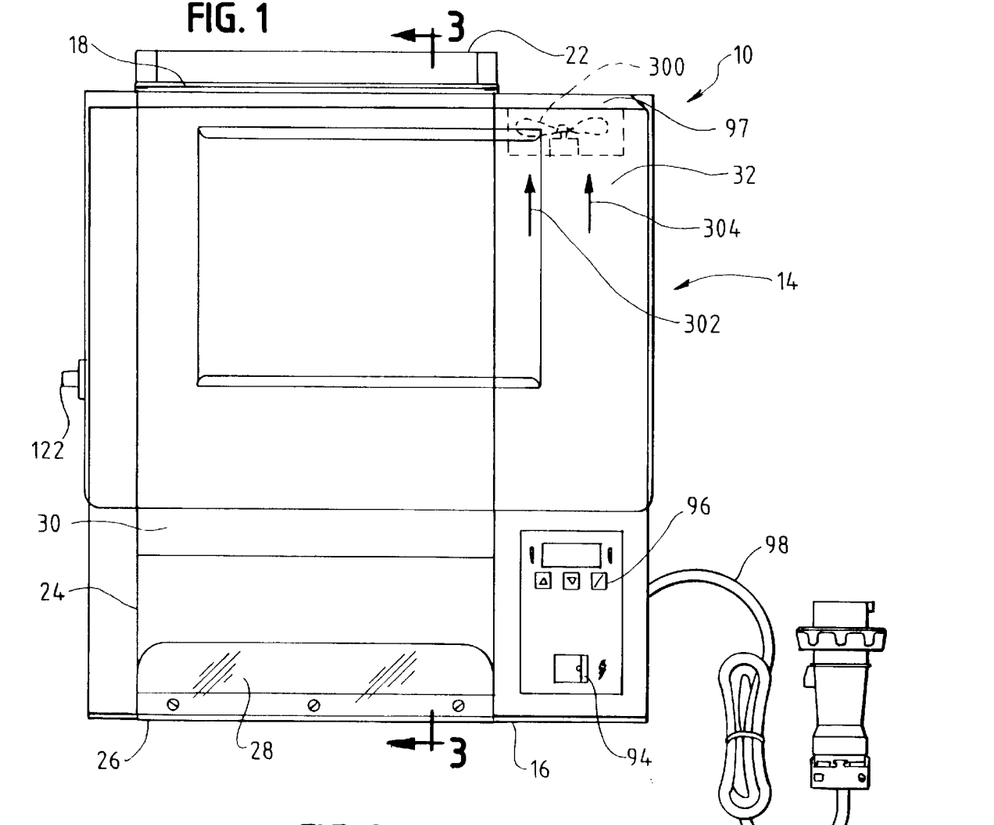
FIG. 1 is a front elevational view of an embodiment of the improved contact toaster of the present invention.
Figure 2:
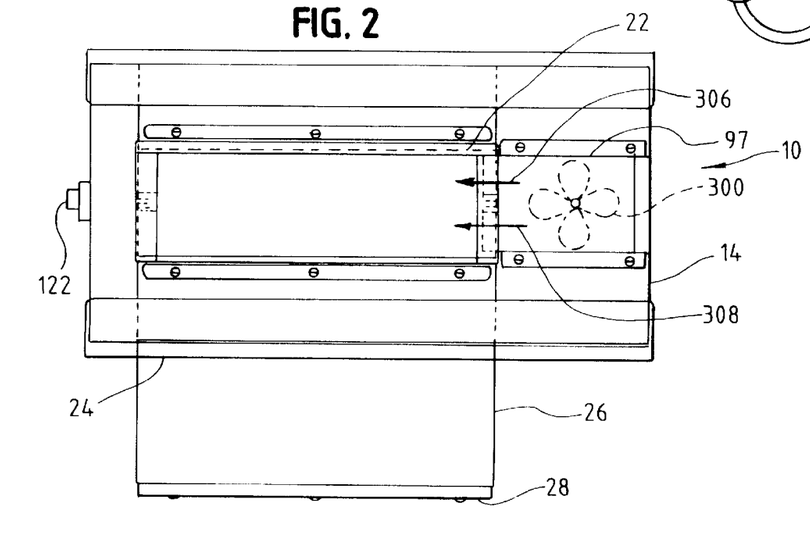
FIG. 2 is a top plan view of the improved contact toaster of FIG. 1.
Figure 3:
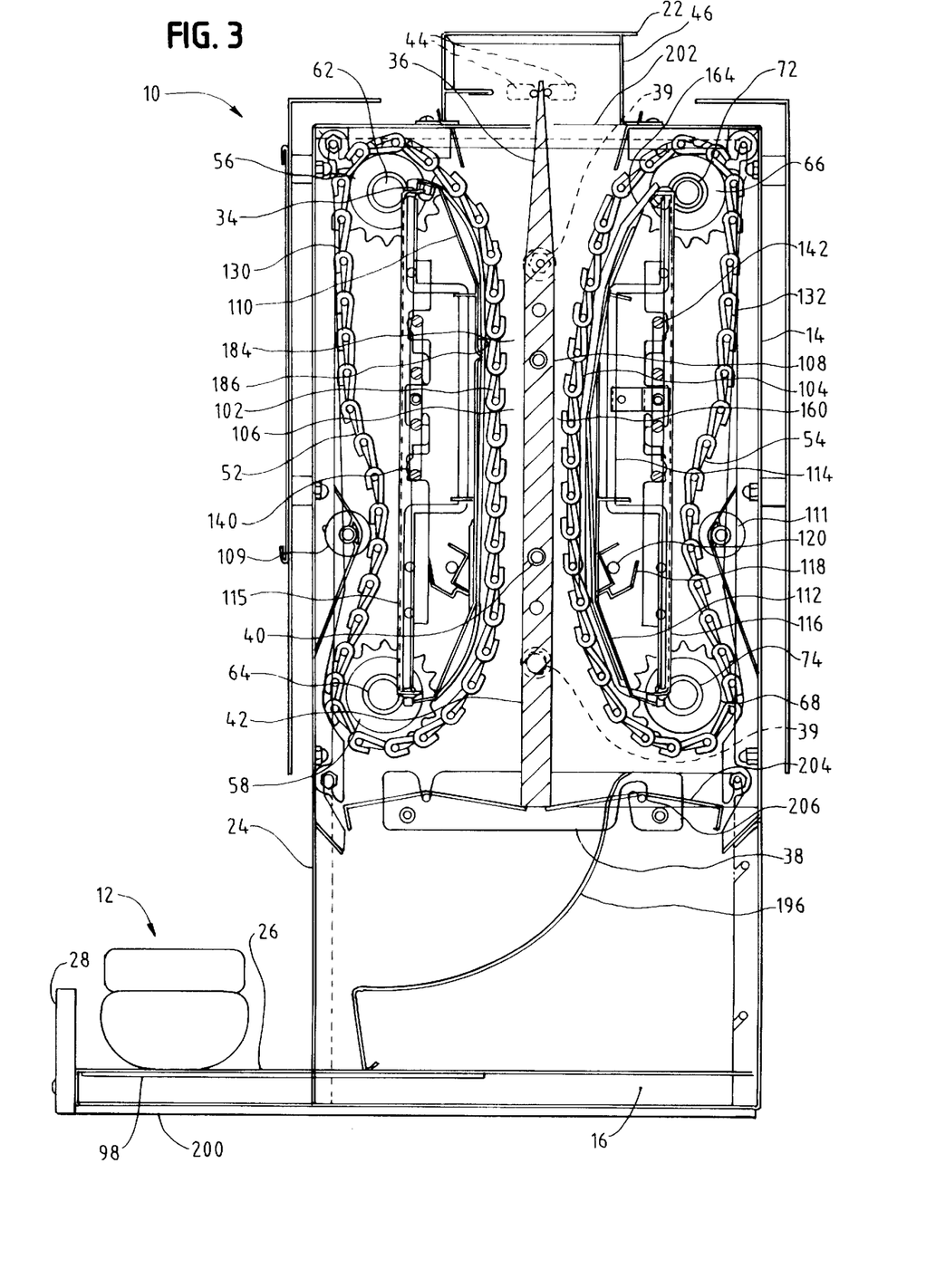
FIG. 3 is a vertical cross-sectional view of the improved contact toaster taken along line 3—3 of FIG. 1.

With reference to FIGS. 1 through 3, an improved contact toaster constructed in accordance with the present invention is indicated generally at 10. While contact toaster 10 may be employed to toast a variety of food items, the embodiment illustrated is particularly adapted to toasting the two halves of a sandwich bun, such as the one indicated generally at 12 in FIG. 3.

As shown in FIGS. 1 and 2, the contact toaster 10 features a housing 14 positioned upon a base 16. An inlet 18 is positioned through the top of housing 10 and receives the bun halves to be toasted. For purposes discussed below, inlet 18 is covered by a bun feeder 22. An outlet 24 is positioned near the bottom of housing 14 and features a tray 26, with a bun stop 28, for receiving toasted buns from the device (as illustrated with bun 12 in FIG. 3). Housing 14 is divided basically into two sections. The first section, indicated at 30 in FIG. 1, houses a toasting chamber. The second section, indicated at 32, houses a drive and control area. Both of these sections will be discussed in more detail below.

Turning to FIG. 3, a toasting chamber 34 is defined within section 30 of housing 14. A platen 36 is disposed through the middle of toasting chamber 34 and is secured to housing 14 by bolts 39. Platen 36 contains resistance heating elements 40 so that its opposing surfaces are heated. The top portion of platen 36 is tapered inwardly so as to ease the feeding of bun halves into the toaster through inlet 18 (FIG. 1). To facilitate movement of the bun halves across platen 36, its surfaces should have smooth, non-stick surfaces. Preferably, such surfaces are provided by wrapping a removable platen sheet 42, made of TEFLON® or a similar non-stick material, around the length of platen 36. The platen sheet 42 is attached to platen 36 with clips 44.

Bun handler 22 lifts off of housing 14 so that clips 44 may be accessed to release platen sheet 42 from platen 36 so that the platen sheet may be removed from housing 14 for cleaning or replacement. When contact toaster 10 is in operation, bun handler 22 is preferably in place to prevent items from inadvertently entering toasting chamber 34. Buns are fed into bun handler 22, and thus through inlet 18 (FIG. 1), through side opening 46.

A pair of link conveyor belts, indicated at 52 and 54, are positioned on opposite sides of platen 36. Conveyor belt 52 is looped around a pair of sprocket wheels 56 and 58 that are secured to axles 62 and 64 in a fixed relationship. Axles 62 and 64 are mounted to housing 14 so that they rotate. Conveyor belt 54 is mounted in a similar fashion about sprocket wheels 66 and 68 and axles 72 and 74.

Figure 4:
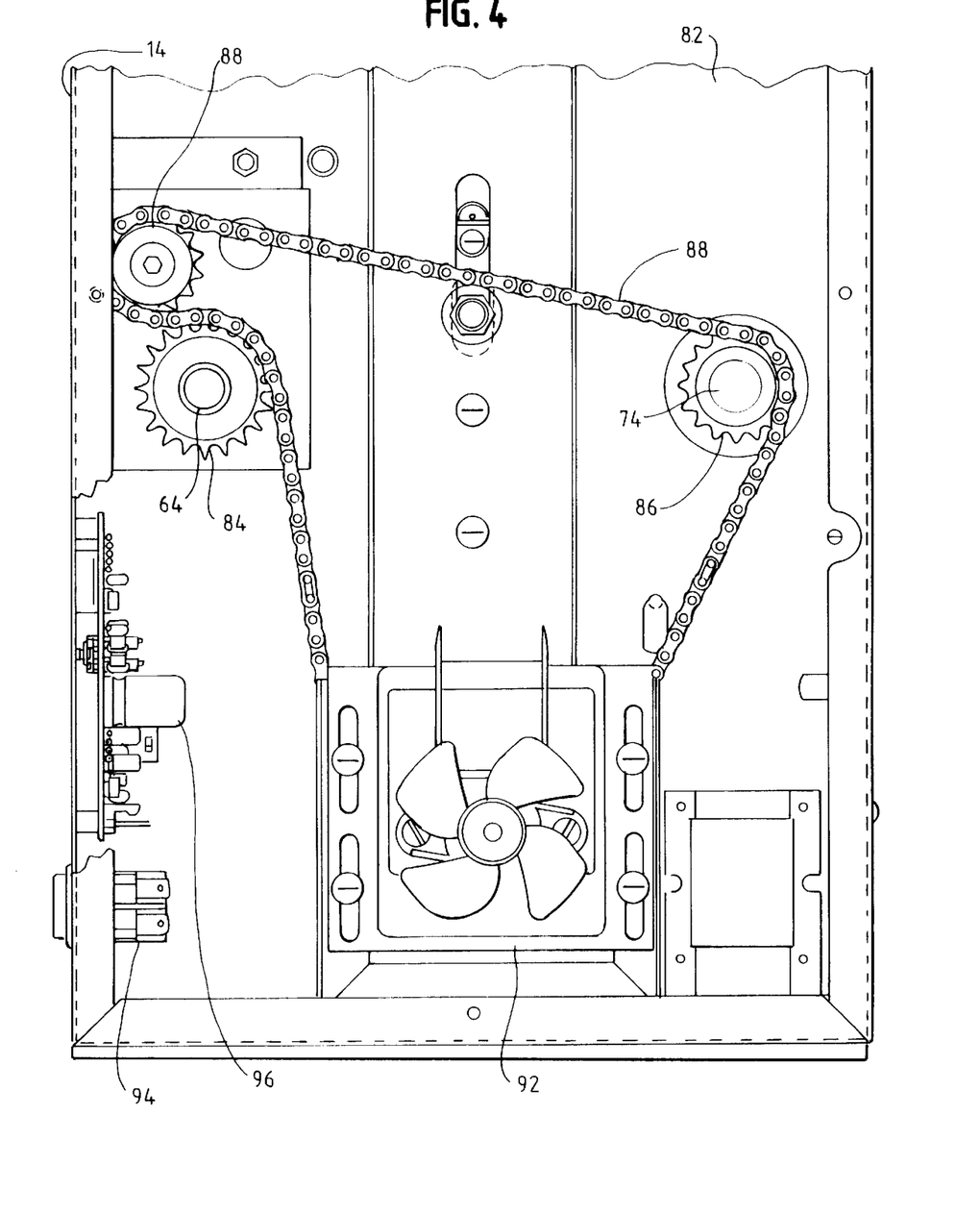
FIG. 4 is a side elevational view of the drive mechanism for the conveyor belts of the improved contact toaster of FIG. 1.

Referring to FIG. 4, axles 64 and 74 extend into the drive and control area 82 housed within section 32 (FIG. 1) of housing 14. The portions of axles 64 and 74 within control area 82 have secured thereto sprocket wheels 84 and 86, respectively. A drive chain 88 wraps around sprocket wheels 84 and 86 as well as an idler gear 88 and a driven gear (not shown) that is rotated by electric motor 92. As a result, electric motor 92 activates conveyor belts 52 and 54 of FIG. 3. Drive and control area 82 also contains a power switch 94 for the device as well as temperature controls 96 that regulate the temperatures of platen 36 and a pair of auxiliary heaters (to be discussed below). Referring to FIG. 1, these electrical components are cooled by air from an air duct 97, positioned on the top of housing section 32, and receive power via an electrical cord, indicated at 98.

Returning to FIG. 3, conveyor belts 52 and 54 feature platen-facing portions 102 and 104 which, along with platen 36, define pathways 106 and 108. Bun halves fed into inlet 18, with their interior surfaces directed towards platen 36, are moved by platen-facing portions 102 and 104 of conveyor belts 52 and 54 through pathways 106 and 108. Pathways 106 and 108 are sized so that the interior surfaces of the bun halves are pressed and slid against platen 36. As a result, the interior surfaces of the bun halves are toasted. A typical bun, however, includes a crown portion and a heel portion that are of unequal dimensions. For example, the crown portion is usually of a greater thickness than the heel portion. Accordingly, it is desirable that the thickness of paths 106 and 108 be adjustable. The present invention allows for this as follows.

Platen facing portions 102 and 104 are biased towards platen 36 by tensioners 110 and 112, respectively, while slack in conveyor belts 52 and 54 is taken up by spring mounted idler rollers 109 and 111. To continue, with tensioner 112 as an example, tensioner 112 is rotatably mounted to a pivot rod, indicated at 114. In turn, pivot rod 114 is rotatably mounted to vertical bracket 116, the latter of which is connected to housing 14. An abutment member 118 is mounted upon an axial rod 120 so as to engage tensioner 112. Abutment member 118 features a profile having a number of sides with surfaces of varying radial distance from axial rod 120. Axial rod 120 is rotatably mounted to housing 14 with one end extending therethrough.

A knob, indicated at 122 in FIGS. 1 and 2, is connected to the extending end of axial rod 120. Accordingly, when knob 122 is turned, axial rod 120 rotates so that a different side of abutment member 118 contacts tensioner 112. As a result, the position of tensioner 112, with respect to platen 36, is changed. An operator may thus adjust the size of pathway 108 so that food items of various thicknesses may be accommodated by the device. The size of pathway 106 may be adjusted in a similar manner.

The links of conveyor belts 52 and 54 are covered by heat-distributing surfaces 130 and 132, preferably in the form of silicone sheets. Alternatively, the heat-distributing surfaces 130 and 132 may be constructed of TEFLON®, alloy steel screen or any other flexible material that allows heat to be distributed over its surface. Heat distributing-surfaces 130 and 132 are also preferably wrapped about conveyor belts 52 and 54 and held in place by clips so that they may be removed for cleaning.

A pair of auxiliary heaters, indicated at 140 and 142 in FIG. 3, are mounted to vertical brackets 115 and 116, respectively. Auxiliary heaters 140 and 142 are sheet-type heating elements of a quartz or resistance type and are controlled by temperature controls 96 (FIG. 1). Due to their positioning, they heat the heat-distributing surfaces of platen-facing portions 102 and 104. As a result, the outer surfaces of the bun halves traveling through pathways 106 and 108 are toasted by contact with platen-facing portions 102 and 104 of conveyor belts 52 and 54.

Figure 5:
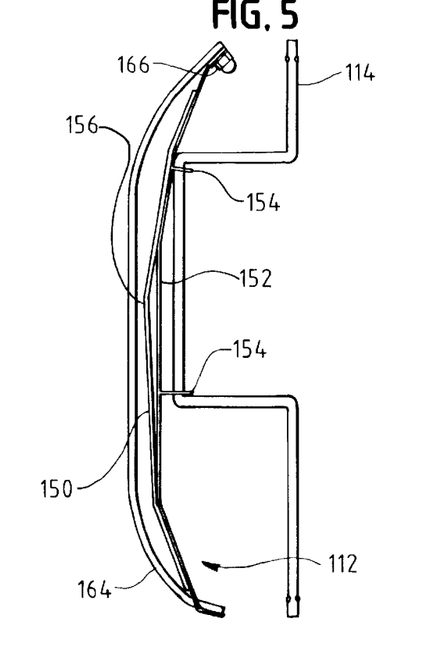
FIG. 5 is an enlarged side elevational view of the crown tensioner assembly of the improved contact toaster of FIG. 1.

Referring to FIG. 5, an enlarged view of tensioner 112 is shown. As may be seen in FIG. 5, tensioner 112 is actually composed of two pieces, indicated at 150 and 152. Both of these pieces are preferably constructed of a somewhat flexible but strong material such as sheet metal. Pieces 150 and 152 may be joined by any permanent method, such as welding or adhesive. Piece 152 has a pair of tabs 154 formed therein that engage pivot rod 114 in a hinge-like fashion.

Piece 150 is joined to piece 152 so as to give tensioner 112 an overall arc-like shape or profile with an apex indicated at 156. As a result of the arc-like shape of tensioner 112, as may be seen in FIG. 3, platen-facing portion 104 tapers inward toward platen 36 and then back out again. This provides pathway 108 with a thickness that tapers inward to a point of minimum thickness, indicated at 160 and corresponding to the apex 156 of tensioner 112 (FIG. 5), and then expands outward again. As a result, a food item traveling through path 108 is gradually compressed to a minimum thickness and is then gradually released to expand back to near it original size. This key feature allows the food item to internally absorb heat from both platen 36 and the heat-distributing surface 132 of platen-facing portion 104 in a sponge-like manner.

Figure 6:
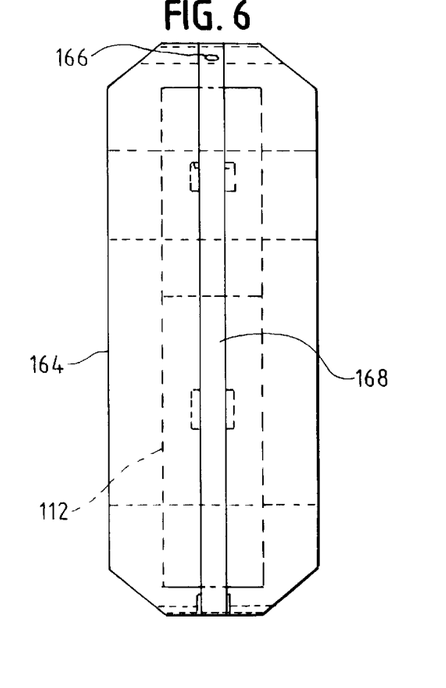
FIG. 6 is a front elevational view of the slide shield and slide rail of the crown tensioner assembly of FIG. 5 showing the tensioner in phantom.

As shown in FIGS. 5 and 6, a slide shield, indicated at 164, is attached to tensioner 112 via nut and bolt 166. As shown in FIG. 3, slide shield 164 separates tensioner 112 and the platen-facing portion 104 of conveyor belt 54. Slide shield 164 is made of a heat-resistant material, such as polytetrafluoroethylene, or PTFE plastic, and preferably has positioned thereon a slide rail constructed of a strip of TEFLON®, indicated at 168 in FIG. 6. This construction allows the heat-distributing surface of conveyor belt 54 to smoothly and quietly slide over tensioner 112.

Figure 7:
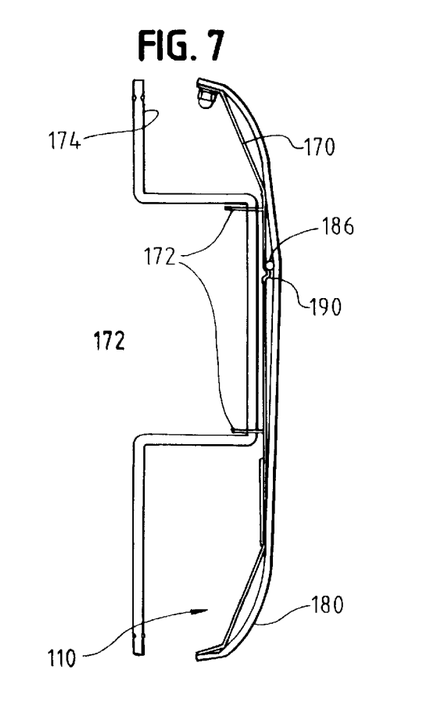
FIG. 7 is an enlarged side elevational view of the heel tensioner assembly of the improved contact toaster of FIG. 1.
Figure 8:
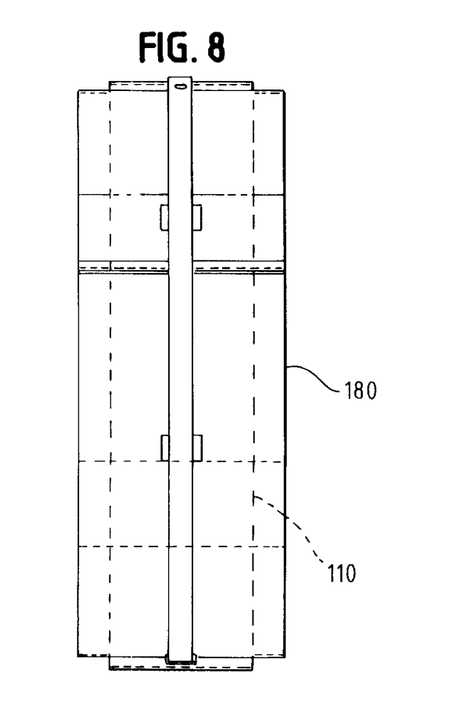
FIG. 8 is a front elevational view of the slide shield and slide rail of the heel tensioner assembly of FIG. 7 showing the tensioner in phantom.

Turning to FIG. 7, an enlarged view of tensioner 110 is shown. Tensioner 110 features a main piece, indicated at 170, that features tabs 172 that engage pivot rod 174 in a hinge-like fashion (as with tabs 154 in FIG. 5). As with tensioner 112, tensioner 110 may be made of sheet metal and has attached thereto a slide shield 180. Slide shield 180 is similar in construction to, and serves the same purpose as, slide shield 164 (FIGS. 5 and 6). As with pathway 108, tensioner 110 provides pathway 106 with a thickness that tapers inward to a minimum thickness, indicated at 184 in FIG. 3, and then expands outward again. The minimum thickness 184 of pathway 106 corresponds to a rod, indicated at 186 in FIGS. 3 and 7, that is placed between slide shield 180 and tensioner 110. Rod 186 is held in position with a hump 190 formed in the main piece 170 of tensioner 110.

As a result, food items traveling through pathway 106 compress and expand so that they are heated internally by heat from platen 36 and the heat-distributing surface 130 of platen-facing portion 102. While food items traveling through pathways 106 and 108 are thus heated internally in the same manner, the construction of tensioner 110 causes the compression and release of pathway 106 to be more abrupt. It has been found that the construction of tensioner 110, and the associated more abrupt compression and release of pressure, is more suitable for heating thinner food items such as the heel portions of sandwich buns. In contrast, it has been found that the more gradual taper provided by tensioner 112 is more effective for thicker items such as the crown portions of sandwich buns. Accordingly, it is preferable that sandwich bun halves be inserted into the device of FIG. 3 so that the crown portions pass through pathway 108 and the heel portions pass through pathway 106.

To summarize thus far, a food item, such as a bun half, is placed into the device of FIG. 3 so that it passes through either pathway 106 or pathway 108, as propelled by conveyor belts 52 or 54. As the bun half passes through, for example, pathway 106, its interior surface is maintained in sliding contact with platen 36 so that it is toasted. Simultaneously, the exterior or outer surface of the bun half is in contact with the heat-distributing surface 130 of the platen-facing portion 102 of conveyor belt 52. Because heat-distributing surface 130 receives heat from auxiliary heater 140, it toasts and/or heats the exterior surface of the bun half. As the bun half travels through pathway 106, it is also compressed to a minimum thickness and then released so that it may expand to nearly its original thickness. This causes the bun half to be heated internally in a sponge-like manner by heat absorbed from platen 36 and platen-facing portion 102.

As a result of this novel heating method, the contact toaster of the present invention offers many advantages over existing contact toasters, such as the one described in U.S. Pat. No. 5,673,610 to Stuck, wherein the exterior surfaces of bun halves are radiated with heat from auxiliary heaters. For example, the buns toasted and heated by the present invention offer a higher overall or "equilibrated" temperature. More specifically, the contact toaster of the present invention effectively heats the interior surface, exterior surface and body of a bun half. In contrast, the contact toaster of Stuck primarily heats the exterior and interior surfaces of a bun half with only incidental heating of the body. As a result, while the bun may feel warm when a consumer touches the exterior and interior surfaces, when she or he bites into the bun, the body is cooler. In addition to the improved tactile sensation of a warmer overall bun, the interior and exterior surfaces of buns toasted by the present invention will stay longer warmer because there will be less heat transfer into the heated body from the surfaces.

The contact toaster of the present invention may also toast and heat buns faster because there is minimal or no contact between the metallic links of conveyor belts 52 and 54 and the food item. More specifically, auxiliary heaters 140 and 142 may be operated at a higher temperature than the auxiliary heaters of Stuck because, due to heat-distributing surfaces 130 and 132, there is minimal danger that the links of conveyor belts 52 and 54 will burn into the bun halves. This allows the temperature of auxiliary heaters 140 and 142 to be raised to a higher level which shortens the time that the buns must spend in pathways 106 and 108 to be properly toasted and heated. This advantage in speed is of great importance in the fast-food industry where time efficiency is key to success.

With reference to FIG. 3, toasted and heated bun halves emerging from pathways 106 and 108 drop onto a chute, indicated at 196. After sliding down chute 196, the buns pass through outlet 24 and onto tray 26 for use. The speed of conveyor belt 54 may be increased by decreasing the diameter of sprocket wheel 86 (FIG. 4). As a result, the speed of conveyor belt 54 may be adjusted so that the crown portion falls onto chute 196 first with the corresponding heel portion dropping on top of it as it slides down chute 196. This results in the bun halves arriving at tray 26 in a stacked configuration, as shown in FIG. 3. This is desirable from a worker and space efficiency standpoint. A base heater 198 in tray 26 keeps the stacked buns warm while they are awaiting use.

The embodiment of the invention illustrated also includes a number of features that make it more energy efficient. As shown in FIG. 3, the bottom of the device features as gasket, indicated at 200, that minimizes heat transfer out of the device through base 16. In addition, inlet and outlet dampers, indicated at 202 and 204, respectively, reduce heat loss out of inlet 18 and outlet 24. Inlet dampers 202 are formed of two flaps made of TEFLON® or a similar material. One end of each flap is clipped to housing 14 so that dampers 202 flex downward to let the food items pass by and into toasting chamber 34. Outlet dampers 204 are balanced about pins 206 so as to be biased in the closed position. As a result, when food items drop out of pathways 106 and 108, outlet dampers 204 swing open to allow passage and then swing shut once again. By reducing the escape of heated air, inlet and outlet dampers 202 and 204 reduce the energy required to maintain toasting chamber 34 and the components therein, such as platen 36, at the proper temperature.

In addition, positioned within air duct 97, on the top of housing 14, is a fan indicated in phantom in FIGS. 1 and 2 at 300. Fan 300 allows an air curtain system to be provided above inlet dampers 202 (FIG. 3). More specifically, as shown in FIG. I by arrows 302 and 304, air is drawn into fan 300 and is ducted out across inlet 18, as indicated by arrows 306 and 308 in FIG. 2. As a result, an air curtain is provided across inlet 18 which provides for additional containment of heat within the device.

While the preferred embodiments of the invention have been shown and described, it will be apparent to those skilled in the art that changes and modifications may be made therein without departing from the spirit of the invention, the scope of which is defined by the appended claims.

What is claimed is:

1. A device for toasting food items comprising:
   a) a housing having an inlet for receiving food items, an outlet for discharging the food items after they are toasted and a toasting chamber located between the inlet and the outlet, said toasting chamber having a platen and a conveyor belt disposed therein with said conveyor belt having a platen-facing portion in a spaced apart relationship with said platen so as to define a pathway therebetween;
   b) means for activating said conveyor belt to move the food items through said pathway; and
   c) a tensioner engaging the platen-facing portion of said conveyor belt, said tensioner shaped so that said pathway tapers inward to a point of minimum thickness and then expands outward again;
      whereby said food items are compressed and released as they travel through said pathway so that they are heated internally by heat from said platen in a sponge-like manner.

2. The device of claim 1 further comprising an auxiliary heater positioned within said toasting chamber in proximity to the platen-facing portion of said conveyor belt.

3. The device of claim 2 wherein said conveyor belt includes a heat-distributing surface that is heated by said auxiliary heater;
   whereby food items are heated internally with heat from the platen-facing portion of the conveyor belt as they move through said pathway.

4. The device of claim 3 wherein said heat-distributing surface is removable from said conveyor belt.

5. The device of claim 3 wherein said heat-distributing surface is made of silicone.

6. The device of claim 1 further comprising:
   a) an axial rod rotatably mounted in said housing; and
   b) an abutment member operatively connected to said axial rod and engaging said tensioner;
   whereby the platen-facing portion of said conveyor belt may be moved with respect to said platen so that said pathway may be adjusted to accommodate food items of various thicknesses.

7. The device of claim 1 further comprising a slide shield disposed between said tensioner and said conveyor belt.

8. The device of claim 1 further comprising a removable platen sheet disposed upon said platen.

9. The device of claim 1 further comprising an inlet damper positioned at said inlet.

10. The device of claim 1 further comprising an outlet damper positioned at said outlet.

11. The device of claim 1 wherein said tensioner includes an apex that corresponds to the point of minimum thickness of the pathway.

12. The device of claim 1 further comprising a rod positioned upon said tensioner at a location that corresponds to the point of minimum thickness of the pathway.

13. A device for toasting food items comprising:
   a) a housing having an inlet for receiving the food items, an outlet for discharging the food items after they are toasted and a toasting chamber located between the inlet and the outlet, said toasting chamber having first and second conveyor belts disposed therein with a platen positioned between them, said first conveyor belt having a first platen-facing portion in a spaced apart relationship with said platen so as to define a first pathway therebetween and said second conveyor belt having a second platen-facing portion in a spaced apart relationship with said platen so as to define a second pathway therebetween;

b) means for activating said first and second conveyor belts to move the food items through said first and second pathways; and c) first and second tensioners, said first tensioner engaging the first platen-facing portion of the first conveyor belt and said second tensioner engaging the second platen-facing portion of the second conveyor belt, said first and second tensioners shaped so that said first and second pathways taper inward to points of minimum thicknesses and then expand outward again;

whereby said food items are compressed and released as they travel through said first and second pathways so that they are heated internally by heat from said platen in a sponge-like manner.

14. The device of claim 13 further comprising first and second auxiliary heaters positioned within said toasting chamber, said first auxiliary heater positioned in proximity to the first platen-facing portion of the first conveyor belt and said second auxiliary heater positioned in proximity to the second platen-facing portion of the second conveyor belt.

15. The device of claim 14 wherein said first conveyor belt includes a first heat-distributing surface that is heated by said first auxiliary heater and said second conveyor belt includes a second heat-distributing surface that is heated by said second auxiliary heater;

whereby said food items are heated internally with heat from the first and second platen-facing portions of the first and second conveyor belts as they move through said first and second pathways.

16. The device of claim 15 wherein said first and second heat-distributing surfaces are removable from said first and second conveyor belts.

17. The device of claim 15 wherein said first and second heat-distributing surfaces are made of silicone.

18. The device of claim 13 further comprising:

a) a pair of axial rods rotatably mounted in said housing; and b) a pair of abutment members, each of said abutment members operatively connected to a different one of said axial rods and engaging a separate one of said first and second tensioners;

whereby said first and second platen-facing portions of said first and second conveyor belts may be moved with respect to said platen so that said first and second pathways may be adjusted to accommodate food items of various thicknesses.

19. The device of claim 13 further comprising first and second slide shields, said first slide shield disposed between said first tensioner and said first conveyor belt and said second slide shield positioned between said second tensioner and said second conveyor belt.

20. The device of claim 13 further comprising a removable platen sheet disposed upon said platen.

21. The device of claim 13 further comprising an inlet damper positioned at said inlet and an outlet damper positioned at said outlet.

22. The device of claim 13 further comprising a chute disposed between said outlet and said first and second conveyor belts with said second conveyor belt positioned in closer proximity to said chute than said first conveyor belt, said second conveyor belt moving faster than said first conveyor belt so that food items that have moved through said first pathway are stacked upon food items that have moved through the second pathway on the chute.

23. The device of claim 13 wherein said first pathway tapers inward more abruptly than said second pathway.

24. The device of claim 13 wherein at least one of said first and second tensioners includes an apex that corresponds to the point of minimum thickness of at least one of said first and second pathways.

25. The device of claim 13 further comprising a rod positioned upon at least one of said first and second tensioners at a location that corresponds to the point of minimum thickness of at least one of said first and second pathways.

26. A device for toasting food items comprising:

a) a housing having an inlet for receiving the food items, an outlet for discharging the food items after they are toasted and a toasting chamber located between the inlet and the outlet, said toasting chamber having first and second conveyor belts disposed therein with a platen positioned between them, said first conveyor belt having a first platen-facing portion in a spaced apart relationship with said platen so to define a first pathway therebetween and said second conveyor belt having a second platen-facing portion in a spaced apart relationship with said platen so as to define a second pathway therebetween;

b) means for activating said first and second conveyor belts to move the food items through said first and second pathways; and c) first and second tensioners, said first tensioner engaging the first platen-facing portion of the first conveyor belt and said second tensioner engaging the second platen-facing portion of the second conveyor belt, said first and second tenisoners shaped so that said first and second pathways taper inwardly to points of minimum thickness and then expand outward again wherein said first pathway tapers inwardly more abruptly than said second pathway;

whereby said food items are compressed and released as they travel through said first and second pathways so that they are heated internally by heat from said platen in a sponge-like manner.

* * * * *

UNITED STATES PATENT AND TRADEMARK OFFICE
CERTIFICATE OF CORRECTION

PATENT NO. : 5,960,704
DATED : October 5, 1999
INVENTOR(S) : Clark R. Agcaoili and Scott P. March It is certified that error appears in the above-identified patent and that said Letters Patent are hereby corrected as shown below:

On the Title Page [75] Inventors:
change "Scott P. March, Lombard; Clark R. Agcaoli, St. Charles" to --Clark R. Agcaoli, St. Charles; Scott P. March, Lombard--

Signed and Sealed this

Third Day of April, 2001

*Attest:*

NICHOLAS P. GODICI

*Attesting Officer*  *Acting Director of the United States Patent and Trademark Office*